Sept. 12, 1944.　　　　A. WINSICK　　　　2,358,120

FLAG HOLDER FOR AUTOMOBILES

Filed Oct. 30, 1942

Anthony Winsick, Inventor
By　　　　
　　　　Attorney.

Patented Sept. 12, 1944

2,358,120

UNITED STATES PATENT OFFICE 2,358,120

FLAG HOLDER FOR AUTOMOBILES

Anthony Winsick, Hamburg, N. Y.

Application October 30, 1942, Serial No. 464,148

9 Claims. (Cl. 248—43)

This invention relates to a flag holder for automobiles.

It has become quite popular to display a flag at the front of an automobile, but since no provision has been made by manufacturers of automobiles for attaching flags to any portion thereof, various methods of and means for securing a flag or flags to the bumper or other part of an automobile have been devised and it has been found that in many cases the means employed is expensive and does not retain the flag in the position intended for the same.

It is also common practice to display a flag on national holidays, and to meet such demands it is the object of my invention to provide a simple, inexpensive flag holder capable of being easily attached to the bumper of an automobile or to one of the brackets by means of which the bumper is secured to the side-members of the automobile chassis.

With this in mind I have illustrated my improved flag holder in the accompanying drawing, showing the same in the two ways in which the holder can be easily and quickly attached to an automobile.

Figure 1:
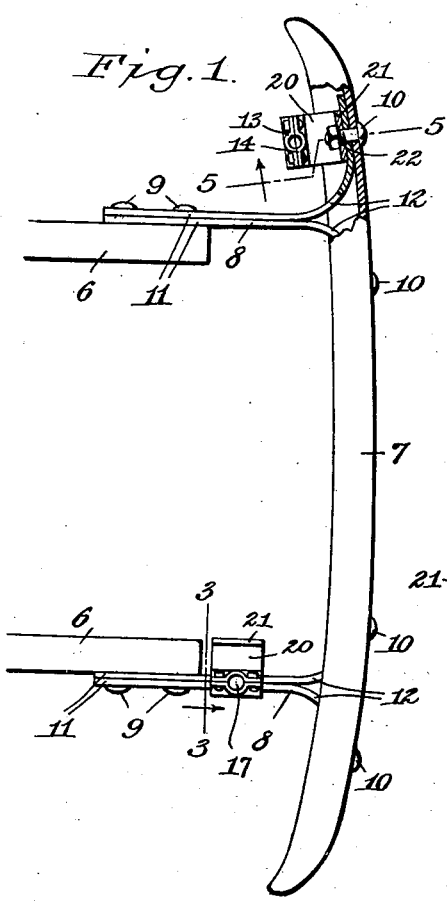
Fig. 1 is a plan view, showing the front ends of the two side-members of an automobile chassis, a bumper, and the brackets by means of which the bumper is attached to said side-members; one of my improved flag holders being shown attached to the bumper near one end thereof and a second to one of the bumper brackets.

In the drawing, the reference numeral 6 designates the side-members of an automobile chassis, 7 the bumper, and 8 brackets fastened to said side-members, as at 9, and having the bumper secured thereto by means of screw bolts 10. These brackets are often referred to as spring brackets and vary in shape and construction. In the particular construction shown two flat bars 11 are employed and these have curved outer ends 12 acting as springs to absorb shock applied to the bumper. The screw bolts 10 are also utilized for fastening my improved flag holder to the bumper, as will appear hereinafter.

My improved flag holder is so constructed that it may be selectively secured to the bumper, or to one of the brackets by means to which the bumper is secured to the automobile, and in its preferred form it comprises a body portion formed of two comparatively narrow elongated sheetmetal parts or members 13 and 14. This holder is used in a vertical position and each part thereof is bulged outward in a vertical plane, as at 15, to form a vertically disposed semi-circular groove 16, this being best shown in Fig. 4. The two elongated parts or members of the holder are placed in contact with each other so that the two semi-circular grooves 16 form a circular socket 17 which opens to the top of the flag holder and into which the staff 18 of a flag is inserted. It is to be noted that the bulges 15 in the sheetmetal parts extend downwardly less than the full length of such parts and that the flag-holding socket is therefore closed at the bottom. Consequently, my improved flag-holder will hold staffs of different sizes up to the exact diameter of the socket, or even slightly larger. Staffs of flags smaller in diameter can, therefore, be placed within the socket with assurance they will not slip down and the flag proper rest upon the holder as would be the case where flag-holding sockets are open at both the top and bottom.

The members 13 and 14 are fastened together with screw bolts 19. One of the members of the holder is longer than the other and bent at its lower end at a right angle, as at 20, and thence upwardly, as at 21, to form a fastening lip for attaching the holder to the inner or rear side of the bumper, as shown in and at the top of Fig. 1. The right-angular portion 20 serves to off-set the main or body portion of the holder from the fastening lip and when attaching the holder to the bumper, which latter is invariably of concavo-convexed formation in cross section, clearance is provided for the body portion of the holder so that it can extend upwardly above the upper edge of the bumper and the flag be readily inserted into the holder. In fastening this flag holder to the bumper, one of the screw bolts 10 employed for fastening the bumper to a bracket is utilized to fasten the holder in place and with this in view, the upstanding fastening lip 21 is provided with a bolt hole 22 through which the bolt 10 of the bumper is passed and when the nut of the bolt is tightened it impinges firmly against the inner face of said upstanding lip and assures a secure fastening of the holder to the bumper. The right angular portion of the holder comprising the parts 20 and 21 may therefore be considered an off-set securing means which enables the holder to be secured to the bumper while positioning the body portion of the holder in a plane in rear of the edges of the bumper.

Figure 3:
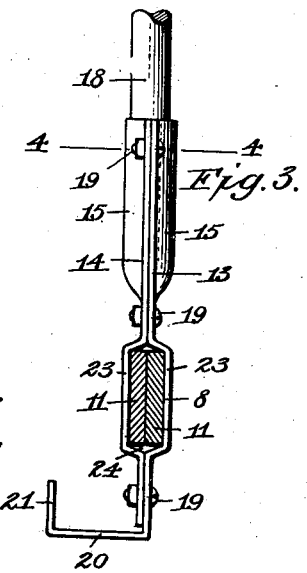
Fig. 3 is an enlarged cross-section taken on line 3—3, Fig. 1, looking in the direction of the arrow crossing said line, showing my improved flag holder in edge elevation, as attached to a bumper bracket.

In order that the flag holder may be attached to one of the bumper brackets 8, each of the members 13 and 14 is off-set or bulged outwardly between its ends and beneath the flag-holding socket 17, as at 23, thereby providing a parallel-sided transverse opening 24 through the body portion of the holder. As shown in Figs. 1 and 3 this transverse opening is in the same vertical plane as the flag-holding socket and it is designed to receive the bracket. It is only necessary to remove the screw bolts 19, separate the two members 13 and 14 and position them at opposite sides of the bracket, after which the screw bolts may be placed through the two members and the nuts thereof tightened to clamp the holder onto the bracket; it being understood, of course, that the bulges 23 provide an opening which is not wider than the thickness of the bracket therein. In this manner a secure fastening of the flag-holder is assured. In some instances the two members of the holder at the region beneath the bracket may not be in full contact and in such case the screw 19 passing through such region would in reality serve as a clamping screw; but in all cases it may be considered as holding the flag-holder in place. Such screw prevents separation-movement of the lower portions of the two members of the holder and by reason of the flag-holding socket and the transverse opening being in the same vertical plane, a simple, neat, and compact flag-holder is provided which can be easily and quickly attached and which will enable a flag to be retained in its socket even though its staff is smaller in diameter than that of the socket receiving it.

Figure 2:
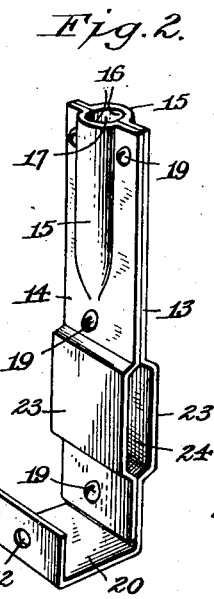
Fig. 2 is a perspective view of my improved flag holder.
Figure 4:
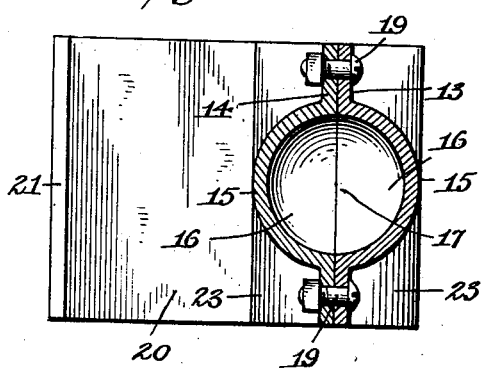
Fig. 4 is still a further enlarged cross-section taken on line 4—4, Fig. 3.
Figure 5:
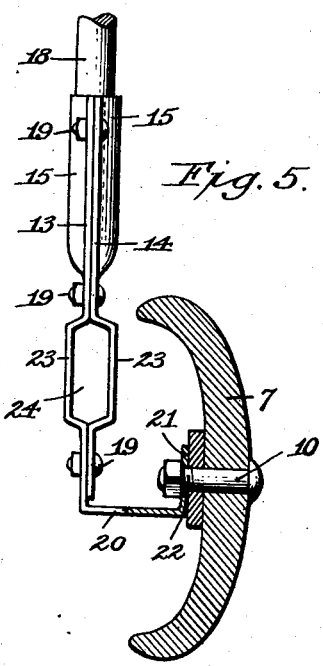
Fig. 5 is an enlarged section taken on line 5—5, Fig. 1, looking in the direction of the arrow crossing said line and showing my improved flag holder in edge elevation and the bumper and the attaching end of the holder in section.

It is to be noted that the heads of the screw bolts 19 are shown in Fig. 2 at that side of the holder from which the offset securing means extends, while in Figs. 3, 4, and 5 the heads of the screw-bolts are arranged at the opposite side of the holder. This is merely to position the nuts applied to said screw bolts so that they are somewhat concealed. So applied, the heads of the screw bolts would be at the outer side of the holder when applied as shown at the bottom of Fig. 1, and at the outer or front side of the holder when the latter is attached to the bumper as shown at the top of Fig. 1.

It will be apparent therefore that with my improved holder, the particular place of attachment to the automobile is optional, since provision is made for attaching the holder to one of the bumper brackets, or to the bumper directly.

It is also to be noted that some bumpers are made of flat material and therefore in some instances the flag holder may be attached to the bumper directly in the same manner as it is shown attached to the bumper bracket in the drawing. Therefore, where in the claims the words "bumper" or "bumper bracket" are used, it is intended to mean either, depending on the construction of such parts.

Having thus described my invention, what I claim is:

1. A flag holder for automobiles formed of two elongated sheet-metal members bulged along vertical lines in opposite directions from their upper ends downwardly and having said bulges terminating short of the lower ends of said members to form an upwardly opening flag-holding socket closed at the bottom and in which a flag may be held in vertical position, said members being fashioned beneath said socket to embrace the bumper bracket of an automobile, and means for fastening said members together to clamp the holder to said bracket.

2. A flag holder for automobiles formed of two elongated sheet-metal members bulged in opposite directions from their upper ends downwardly to form an upwardly opening flag-holding socket, said members being offset in opposite directions between their ends to form an opening trending in a direction at right angles to said socket and adapted to receive a part of an automobile, and means to fasten said members together so as to clamp said automobile horizontally disposed part in said opening.

3. A flag holder adapted to be applied to an automobile in a vertical position, comprising two comparatively narrow elongated members, each bulged in concavo-convexed fashion from its upper end downwardly, said bulges terminating at their lower ends between the upper and lower ends of said members and having the concaved sides thereof arranged in opposition to form an upwardly-opening cylindrical socket extending part way along the length of the holder and adapted to receive the staff of a flag, screw bolts passed through said members to fasten the same together, and means beneath and in the vertical plane of said socket to fasten the holder to a horizontally-disposed part of an automobile.

4. A flag holder adapted to be applied to an automobile in a vertical position, comprising two comparatively narrow elongated sheet-metal members bulged in concavo-convex fashion from their upper ends downwardly to form an upwardly-opening socket adapted to receive the staff of a flag, said members being bulged in opposite directions transversely beneath said socket to form a transverse opening in the holder extending from one side edge thereof to the other and adapted to receive a bumper bracket therein, and means above and beneath said transverse opening to fasten said members together.

5. A flag holder for automobiles comprising a body portion formed of two comparatively narrow elongated sheet-metal members bulged in opposite directions from their upper ends downwardly and terminating between the upper and lower ends of said members to form an upwardly-opening socket adapted to receive the staff of a flag, one of said members being longer than the other and the longer of said members being bent at a right angle at its lower end and provided with an upwardly-directed terminal off-set with respect to the body portion of said holder, said upwardly-directed terminal having means to secure the flag holder to an automobile.

6. A flag holder for automobiles, comprising a body portion formed of two comparatively narrow elongated sheet-metal members detachably fastened together face to face, said members being bulged in opposite directions from their upper ends downwardly to form an upwardly-opening socket adapted to receive the staff of a flag and having oppositely-bulged portions at a right-angle to said first-mentioned bulged portions to form a transverse opening through said body portion beneath said socket and extending from one side edge of said body portion to the other, one of said members being longer than the other and having its lower end portion bent at a right-angle beneath said other member and provided with an upstanding terminal out of alinement with said body portion, and means at said terminal to attach the holder to an automobile.

7. A flag-holder comprising a body portion having a vertically disposed flag-holding socket opening to the upper end of said body portion and a transverse opening beneath said socket providing two spaced-apart portions adapted to be positioned at opposite sides of an automobile bumper bracket, and a screw-bolt passed through said flag-holder for holding said spaced apart portions against the opposite faces of the bumper bracket so as to firmly fasten the holder in place thereon.

8. A flag holder for automobiles formed of two elongated sheet-metal members bulged in opposite directions from their upper ends downwardly to terminate short of their lower ends so as to form an upwardly opening flag-holding socket in which a flag may be held in vertical position, said members being fashioned beneath said bulges to form a transverse opening in the holder adapted to receive a bumper bracket of an automobile, and means for fastening said members together to clamp said holder to said bracket.

9. A flag holder adapted to be applied to an automobile in a vertical position, comprising two comparatively narrow elongated members, each bulged in concavo-convex fashion from its upper end downwardly to terminate short of their lower ends and having the concaved sides thereof arranged in opposition to form an upwardly opening cylindrical socket extending part way through the length of the holder and adapted to receive the staff of a flag, screw bolts passed through said members to fasten the same otgether, and means forming part of said members beneath said socket to fasten the holder to a horizontally disposed part of an automobile.

ANTHONY WINSICK.